US012599539B2

(12) United States Patent
Spencer

(10) Patent No.: US 12,599,539 B2
(45) Date of Patent: Apr. 14, 2026

(54) THERAPEUTIC MASSAGE DEVICE

(71) Applicant: Spence Spencer, Phoenix, AZ (US)

(72) Inventor: Spence Spencer, Phoenix, AZ (US)

(*) Notice: Subject to any disclaimer, the term of this patent is extended or adjusted under 35 U.S.C. 154(b) by 875 days.

(21) Appl. No.: 17/714,915

(22) Filed: Apr. 6, 2022

(65) Prior Publication Data

US 2022/0313546 A1 Oct. 6, 2022

Related U.S. Application Data

(60) Provisional application No. 63/286,047, filed on Dec. 5, 2021, provisional application No. 63/171,140, filed on Apr. 6, 2021.

(51) Int. Cl.
*A61H 23/02* (2006.01)

(52) U.S. Cl.
CPC ..... *A61H 23/02* (2013.01); *A61H 2201/1635* (2013.01); *A61H 2201/164* (2013.01); *A61H 2201/1671* (2013.01); *A61H 2201/1676* (2013.01); *A61H 2201/1695* (2013.01); *A61H 2205/12* (2013.01)

(58) Field of Classification Search
CPC ............ A61H 23/02; A61H 2201/1635; A61H 2201/164; A61H 2201/1671; A61H 2201/1676; A61H 2201/1695; A61H 2201/1685; A61H 2205/12; A61H 2205/065; A61H 2205/106; A61H 2015/0071; A61H 2015/0042; A61H 15/0078
See application file for complete search history.

(56) References Cited

U.S. PATENT DOCUMENTS 4,660,548 A * 4/1987 Bucher .............. A61H 23/0254 482/79
9,775,770 B2 * 10/2017 Eastman .............. A61H 1/0266
D807,079 S * 1/2018 Failing ........................... D6/592
D876,122 S * 2/2020 Hu ................................. D6/582
11,324,347 B2 * 5/2022 Rindlisbacher .... A47G 27/0231
2006/0211960 A1 * 9/2006 Kries ..................... A61H 23/02 601/56

(Continued)

FOREIGN PATENT DOCUMENTS

CN 110870828 A * 3/2020 ............. A61H 15/00
KR 200457503 Y1 * 12/2011 ............ A61H 15/00

*Primary Examiner* — Tu A Vo
*Assistant Examiner* — Kelsey E Baller
(74) *Attorney, Agent, or Firm* — Invention To Patent Services; Alex Hobson

(57) ABSTRACT

A therapeutic massage device includes a pressure head configured in a therapy side of a platform. The platform may pivot or rotate to enable varying stretch and therapy angles to activate a variety of muscles. The pressure head may be pressed against a body part and in particular an appendage, such as a person's foot or hand to stimulate reflexes and massage muscles and other soft tissue for therapy. The angle of the platform may be selected to provide the best angle for pressure application via the pressure head. A platform may rotate about a pivot or have a shape to allow the platform to rotate on a curved surface. A platform may have curved therapy surfaces to enable varying degrees of stretch. A pressure head may include a vibration device and may be a massage ball that is detachably attachable to the platform.

15 Claims, 19 Drawing Sheets

(56) References Cited

U.S. PATENT DOCUMENTS

| | | | | |
|---|---|---|---|---|
| 2010/0228169 | A1* | 9/2010 | Ootani | A61H 15/00 601/118 |
| 2010/0262050 | A1* | 10/2010 | Gasparovich | A47D 9/057 5/655 |
| 2013/0184126 | A1* | 7/2013 | Kole | A63B 23/10 482/79 |
| 2018/0214733 | A1* | 8/2018 | DeNunzio | A63B 21/4037 |
| 2019/0380906 | A1* | 12/2019 | Lin | A61H 15/00 |
| 2020/0016026 | A1* | 1/2020 | Depta | A61H 1/00 |
| 2020/0093675 | A1* | 3/2020 | Hale | A43B 7/146 |
| 2020/0179211 | A1* | 6/2020 | Zanyk | A61H 1/0266 |
| 2022/0273982 | A1* | 9/2022 | Malagon | A63B 23/03525 |

* cited by examiner

THERAPEUTIC MASSAGE DEVICE

CROSS REFERENCE TO RELATED APPLICATIONS

This application claims the benefit of priority to U.S. provisional patent No. 63/171,140, filed on Apr. 6, 2021, and to U.S. provisional patent application No. 63/286,047, filed on Dec. 5, 2021.

BACKGROUND OF THE INVENTION

Field of the Invention

The invention relates to a therapeutic massage device having one or more pressure heads and surfaces for applying pressure to a body part, and particularly to the foot or hand.

Background

Massage devices for appendages including the foot, hand, arms and legs may have limited range of motion and may not effectively stretch or trigger desired muscles, joints or connective tissue including ligaments and tendons.

SUMMARY OF THE INVENTION

The invention is directed to a therapeutic massage device having one or more pressure heads configured to provide a plurality of massage orientations. The pressure head may be or include a vibration device and may be configured on a platform. The platform may be fixed or may pivot and may pivot about the pressure head to provide varying angles of pressure application to body parts. The pressure head may be convex in shape and protrude from a therapy surface, such as a foot platform. Also, two pressure heads may be configured an offset distance from each other to provide two pressure points of contact to enable stretching and triggering nerves for therapeutic purposes. An exemplary therapeutic massage device may provide a variety of orientations for placement of an appendage, such as the foot or hand and may have a plurality of sides or therapy surfaces for targeting specific muscles, nerves and tendons. Some of the therapy surfaces may be convex in shape to enable a higher pressure or reduced area of contact while other therapy surfaces may be concave in shape to allow a portion of the appendage to flex therein.

The therapeutic massage device is configured to activate the deep interior muscles of the lower leg and forearm. The specific muscles the therapeutic massage device targets are often ignored and not considered during stretching and different therapies. The therapeutic massage device may be configured to trigger nerves in the foot and also up the leg such as in the calf, thigh, hamstring and hip. The therapeutic massage device may provide two or more points of contacts or pressure heads that enable a portion of the body, such as the arch of the foot or palm of the hand to be stretch between the two pressure heads. Also, a pressure head may be configured to rotate or move thereby allowing further stretching while applying pressure to the pressure head. The two points of contact also enable a push/pull engagement that creates leverage to more effectively stretch muscles, tendons and ligaments, such as the Achilles tendon. A specific geometry that is useful for treatment is two pressure heads with a concave surface between them, to provide room for stretching down into the concave surface. Any of the pressure heads could be or include a vibration device that enhances the massage while applying pressure to the pressure head. A vibration device or vibration pressure head vibrates at an amplitude and frequency and these may be change or adjusted for a particular therapy.

The standard stretch for the calf muscle activates the soleus muscle and the medial and lateral head of the gastrocnemius and these muscles possess respective stimulation/activation points at the base of the ankle with the insertion located at the triceps surface muscle. This makes the standard calf stretch effective for both of these muscles. The muscles that are not properly activated with the standard calf stretch are the flexor hallucis longus, fibularis longus, flexor digitorum, and tibialis posterior muscles. To activate these muscles, one must focus on their insertion points located on the bottom of the foot. The pressure head of the device provides stimulus to the insertion portion of each of the specific muscles. The insertion of the flexor hallucis longus muscle is activated with pressure on the planar aspect of the base of the distal phalanx of the great toe. The insertion of the fibularis longus is activated with pressure applied to the plantar surface of the medial cuneiform bone and the plantar aspect of the base of the first metatarsal bone. The insertions of the flexor digitorum are activated with pressure applied to the plantar aspect of the base of the distal phalanx of the second toe, third toe, fourth toe, and fifth toe. The insertion of the tibialis posterior muscles are activated with pressure applied to the tuberosity of the navicular bone, the plantar aspect of lateral cuneiform bone, the plantar aspect of intermediate cuneiform bone, the plantar aspect of medial cuneiform bone, the plantar aspect of the base of the second metatarsal bone, plantar aspect of the base of fourth metatarsal bone and the plantar aspect of the base of third metatarsal bone. The same concept applies to stretching the deep inner muscles of the forearm. The flexor digitorum superficialis muscle is stimulated with a focus at the insertion points of the palmar aspect to the body to the middle phalanx of the little finger, ring finger, middle finger and index finger. The flexor digitorum profundus muscle is stimulated with a focus at the insertion points of the palmar aspect of the base of the distal phalanx of the little finger, ring finger, middle finger, and index finger.

In an exemplary embodiment, the platform may pivot or rotate about a curved surface to provide varying or dynamic stretching angles. The pressure head may be pressed against a body part and in particular an appendage, such as a person's foot or hand, to stimulate reflexes and massage muscles and other soft tissue for therapy. The angle of the platform may be selected to provide the best angle for pressure application via the pressure head. A wedge may be configured over the platform and around the pressure head to provide or cause more or less flexure of a joint coupled with and appendage. In addition, the pressure head may be interchangeable, wherein the size can be changed for effective therapy. For some therapies a pressure head with a relatively large size, or radius of curvature may be used, such as about 5 cm or more, 7 cm or more 10 cm or more and any range between and including these values, and for other therapies, a pressure head with a smaller radius of curvature may be desired, such as about 1 cm or more, 2.5 cm or more, 5 cm or more, or no more than about 6 cm and any range between and including the values provided. A vibration device may be used to produce vibration in the pressure head. The magnitude of vibration may be changed by a vibration controller.

An exemplary therapeutic massage device has a base with a platform coupled to the base by a pivot. The pivot may be centrally located along the length of the platform. Alternatively, the pivot may be configured on either side of the pressure head to provide stability of the platform. A head aperture in the platform enables the platform to pivot about the pressure head, wherein a portion of the pressure head extends up through the platform. A spring device may be used to retain the platform in a horizontal orientation and a force may be required to overcome the spring force to pivot the platform down or up. The spring may require a user to push on the platform to cause it to pivot and this may engage muscles that improve therapeutic effects. A spring is represented herein as a coil spring but may be an elastomeric material that required deflection or compression when the platform is pivoted. A standoff may be configured between the base and the platform to provide room for the platform to pivot. The platform may pivot a pivot angle up and/or down from horizontal and the pivot angle may be about 20 degrees or more, about 30 degrees or more, about 45 degrees or more, about 60 degrees or more and any range between and including the pivot angles provided. Note that the pivot angle may be an upward and/or downward angle from a horizontal axis, wherein an end of the platform may extend up or down from horizontal.

A wedge may be detachably attached to the platform to produce an interface angle between the platform and the wedge therapy side that creates more or less flexure in a joint for more effective therapy. Increases in flexure of a joint may activate muscles, nerves and/or tendons that otherwise might not be activated for treatment. A wedge may also be used to control the amount of exposure the pressure head has through the therapy side of the wedge, or to adjust height of the exposed pressure head extending through the wedge. An exemplary wedge has a wedge aperture that extends through the wedge to allow the pressure head to extend into and/or up and out of the top surface, when placed on the platform. An exemplary wedge may be made of an elastomeric material that is compressible, whereby the wedge can be compressed and upon removal of the compressive load it returns to an original shape; such as by application of force by a foot or hand. An exemplary wedge may be made out of a foam, such as a polyurethane foam that may be a resilient foam, silicone, rubber and the like.

An exemplary therapeutic massage device may include a platform that is a split teardrop shaped, or about half of a teardrop shape, which has a curved portion along a back side forming a split teardrop shaped cross-sectional platform. A split teardrop shaped platform has a cross section from the front to the back that extends up from the base and has a curved portion along the transition from a therapy side to a back side and/or along the back side to the base side. An exemplary split teardrop shaped platform may have a left therapy portion and a right therapy portion that are split teardrop shaped. A recessed therapy portion may be configured between the left and right therapy portions and may include a pressure head extending up from the therapy side. Again, the pressure head may include a vibration device. The platform may be turned upside down to position the base side up to allow the platform to rotate along the curved portion to provide dynamic stretching and/or adjustable stretch angles.

An exemplary therapeutic massage device may include a platform that is wedge shaped having a therapy side that is inclined a wedge angle from a front to a back of the platform with respect to the base side or ground surface. The wedge angle may be about 20 degrees or more, about 30 degrees or more, about 40 degrees or more, about 50 degrees or more, about 60 degrees or less, or from about 20 to about 60 degrees or any other range between and including the wedge angles provided. The base side may be planar to allow the platform to align and rest on a horizontal ground surface. A central concave therapy portion may extend between a left and right therapy portion; each of which extends from the front to the back of the platform. The left side and right side therapy portions may have concave therapy surfaces and the central therapy portion may have a convex therapy surface. A pressure head and/or vibration device may be configured in the central concave therapy portion to activate muscles.

An exemplary therapeutic massage device maybe a multi-side therapeutic massage device with a plurality of faces or sides for providing therapy to the foot or hand, for example. The exemplary therapeutic massage device has a front side with foot platform that is configured at a wedge angle, as defined herein with respect to the base side or base and a pressure head extending out from the foot platform. The pressure head on the foot platform may be a vibration device and may be spherical in shape or have a convex surface that extends out from the foot platform. The pressure head and/or vibration device may be detachably attachable to the foot platform to provide different surface profiles for therapy, such as different diameters or radius of curvature. Also, the foot platform pressure head may be configured to rotate within an aperture in the foot platform to allow stretching of the hand or foot pressed thereon during therapy.

The multi-side therapeutic massage device may have a therapy portion on the left and/or right sides. The left or right side may have flanges that extend out along the base and may have a flange pressure head configured thereon which may be well oriented for pressing the heel of a foot or the palm of the hand thereon for therapy. The left or right side may have an upper therapy or pressure head configured an offset distance up from the flange and the flange pressure head. The ball of the foot or upper part of the hand or fingers may be place on this upper therapy or pressure head. Any of these flange or upper pressure heads may be or include a vibration device, as described herein. Also, the left and right sides may have different configurations to enable variation in the placement and surface profile of contact for therapy. For example, the left upper pressure head may have a convex therapy surface that has a radius of curvature that is substantially different, or at least 20% different, from a radius of curvature of a right upper pressure head. Likewise, the left flange pressure head may be substantially different in radius of curvature from the right flange pressure head. Any of these pressure heads on the right and left sides may be or comprise a vibration device. For example, one of the left and right side may have a vibration device in the flange pressure head and the other may have a vibration device in the upper pressure head.

The multi-side therapeutic massage device may have a top therapy portion comprising a domed or curved top portion that may be used to applying pressure to the hand or foot. The top therapy portion may have a curved surface with a radius of curvature of at least 30 mm and this curved surface may extend about the front, left and right sides.

The multi-side therapeutic massage device may have a heel cup that is configured to retain a person's heel during therapy. The heel cup may be configured to extend from the front side or from the foot platform and may be adjustable in position or slidably engaged with the foot platform or front side. Rails or pin and apertures may be used for example to retain the heel cup in a desired position along the foot platform. This adjustable heel cup position may allow a variety of foot sized to be retained while pressure is applied to the various portions of the foot by the pressure head extending from the foot platform.

The multi-side therapeutic massage device may be sized for a person to position their foot or hand thereon and may have a length on the base from the left side to the right side of about 20 cm or more, about 25 cm or more, about 30 cm or more, about 40 cm or more, about 50 cm or more, no more than about 60 cm and any range between and including the length values provided. An exemplary multi-side therapeutic massage device may have a width from the front side to the back side of about 10 cm or more, about 15 cm or more, about 20 cm or more, about 30 cm or more, no more than about 50 cm and any range between and including the width values provided. An exemplary multi-side therapeutic massage device may have a height from the base to the top of about 15 cm or more, about 20 cm or more, about 25 cm or more, about 30 cm or more, about 40 cm or more no more than about 50 cm and any range between and including the height values provided.

An exemplary therapeutic massage device may include have a curved base side to allow the device to rotate about the base. The device may include a first platform having first platform axis and a second platform having a second platform axis that intersects with the first platform axis to form an obtuse angle, greater than 90 degrees but less than 180 degrees. A recessed therapy portion may be configured between the first and second platforms. A pressure head and/or vibration device may be configured in one of the first and/or second platforms.

An exemplary therapeutic massage device comprises one or more pressure heads that extend up through the platform to provide pressure to a body part, such as an appendage for therapy. A portion of the pressure head, such as the extended end configured for contact with the body part may be curved or have a radius of curvature. The extended end of the pressure head is configured to extend up through the head aperture of the platform and through the wedge aperture when a wedge is placed on the platform. The radius of curvature or diameter of an extended end of a pressure head may be about 2 cm or more, about 5 cm or more, about 5 cm or more, about 10 cm or more and any range between and including the values provided. A first pressure head may have an extended end with a first size and a second pressure head may have an extended end with a second size that is substantially larger than the first size, wherein the second size is least 25% larger than the first size. The first size may be a radius of curvature and the second size may be a radius of curvature.

An exemplary therapeutic massage device may comprise a vibration device that extends up from the therapy side of the platform. A pressure head may have a vibration device configured within the pressure head, such as a massage ball. The vibration device may be coupled to the base and also coupled to the pressure head to produce a vibration of the pressure head. A vibration control may be used for regulating the vibration of the vibration device. An exemplary vibration control controls a vibration amplitude and/or vibration frequency. An exemplary pressure head may be a massage ball, which is a spherical shaped device having a vibration device therein. The therapy platform may have a head aperture to receive the pressure head, such as a massage ball. Also, the pressure head, such as a massage ball may be detachably attachable to the therapy platform and the therapy platform may have a head aperture to receive the pressure head.

Any of the Pressure Heads or Vibration Devices

An exemplary platform of the therapeutic massage device may be sized for a person to position their foot or hand thereon and may have a length of about 25 cm or more, about 30 cm or more, about 40 cm or more, about 50 cm or more, no more than about 60 cm and any range between and including the length values provided. Likewise, a platform may have a width of about 10 cm or more, about 15 cm or more, about 20 cm or more, about 30 cm or more, no more than about 50 cm and any range between and including the width values provided.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
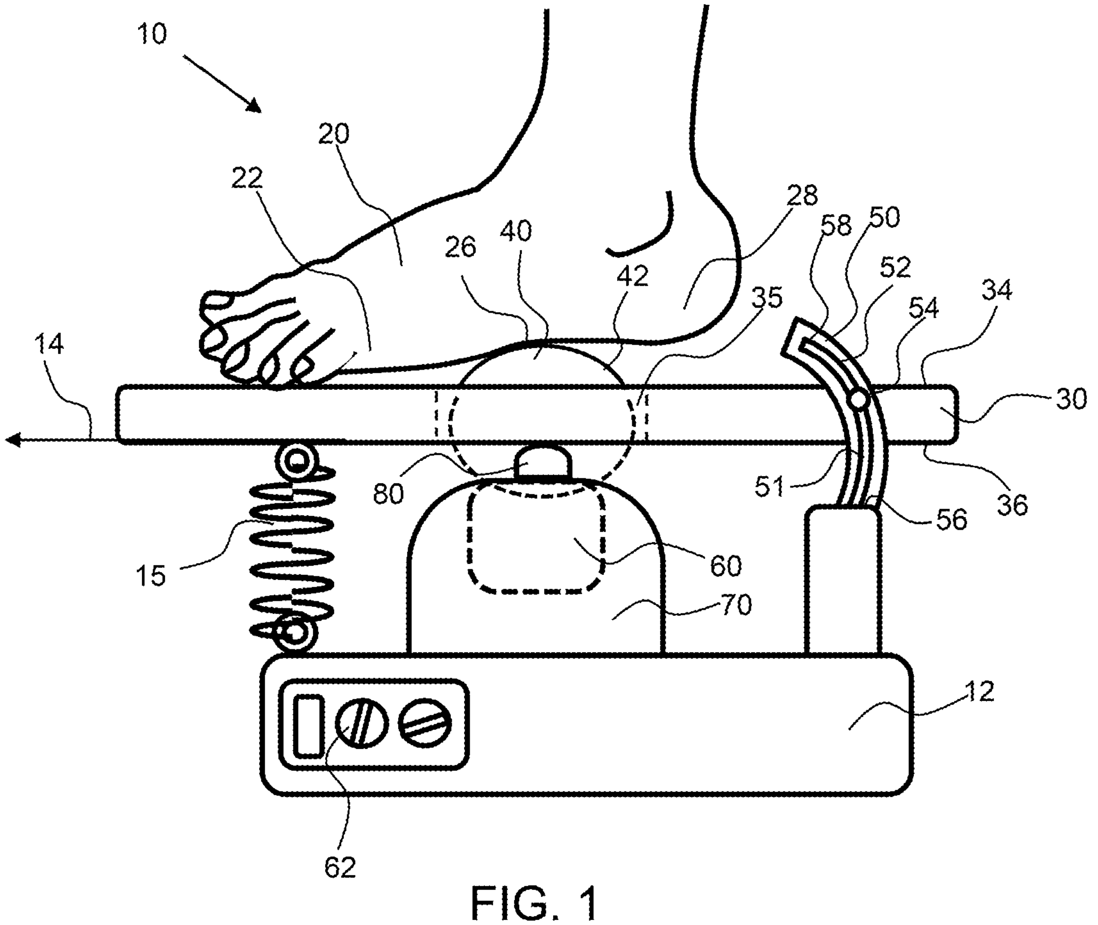
FIG. 1 shows a side view of an exemplary therapeutic massage device having a platform with a pressure head coupled with the base and extending through a head aperture in the platform.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
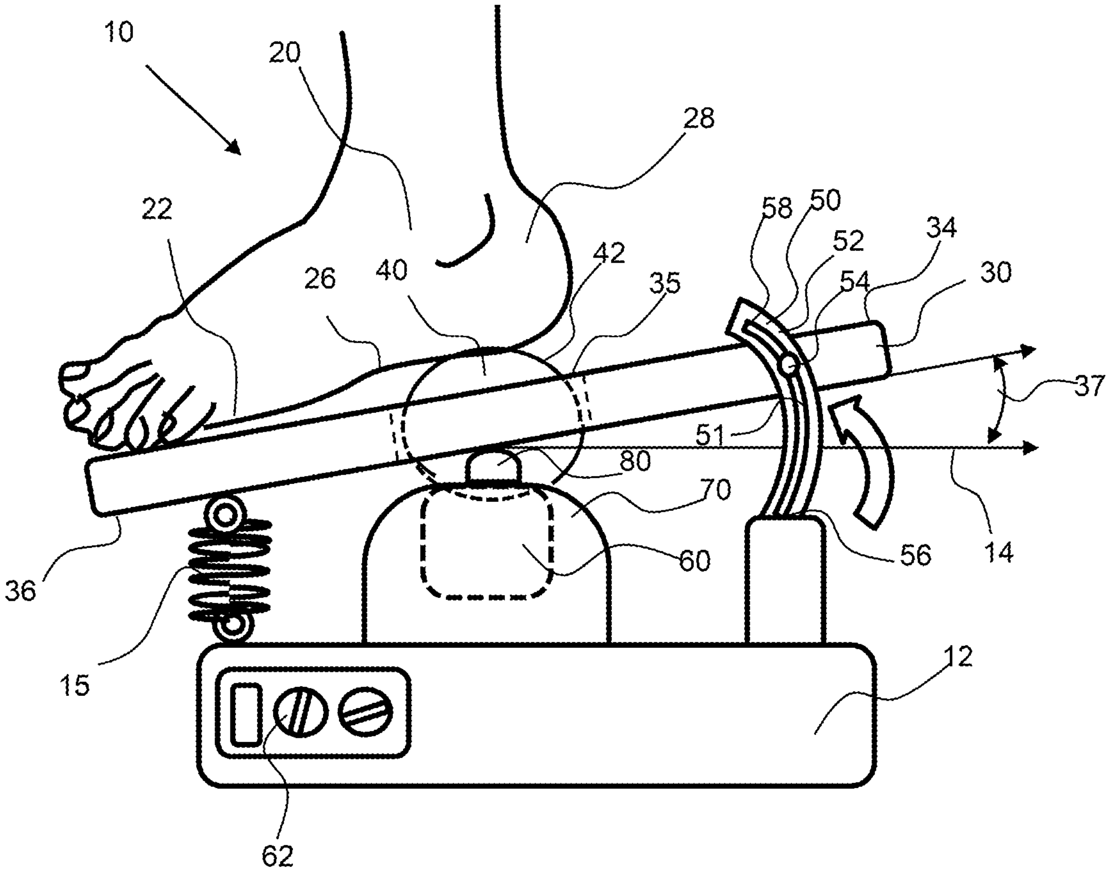
FIG. 2 shows a side view of the exemplary therapeutic massage device shown in FIG. 1 with the platform now pivoted down to apply pressure on the heel of the foot.

Referring now to FIGS. 1 to 5, an exemplary therapeutic massage device 10 has a platform 30 with a pressure head 40 coupled with the base 12 and extending through a head aperture 35 in the platform. The pressure head has a curved surface portion 42 that is configured on the therapy side 34 of the platform. The base 12 is configured on the base side 36 of the platform. A pivot 80 couples the platform to the base 12, such as via a standoff 70 configured on the base. The standoff provides room for the platform to pivot an effective pivot angle 37. The pivot enables the platform to pivot about the pressure head. As shown in FIG. 1, the platform is horizontal and extends along the horizontal axis 14, and the arch 26 of a person's foot 20 is configured over the curved surface portion 42 of the pressure head 40. The pressure head is spherical in shape and has a convex therapy surface. The arch 26 of the person foot is receiving pressure therapy by pressing on the pressure head. As shown in FIG. 2, the platform is angled downward with respect to the horizontal axis 14 a pivot angle 37, and the heel 28 of a person's foot 20 is configured over the curved surface portion 42 of the pressure head 40. The downward angle is with respect to the front of the platform being angled downward. This angle and pivoting platform enables unique pressure application to various areas of the foot.

Figure 3:
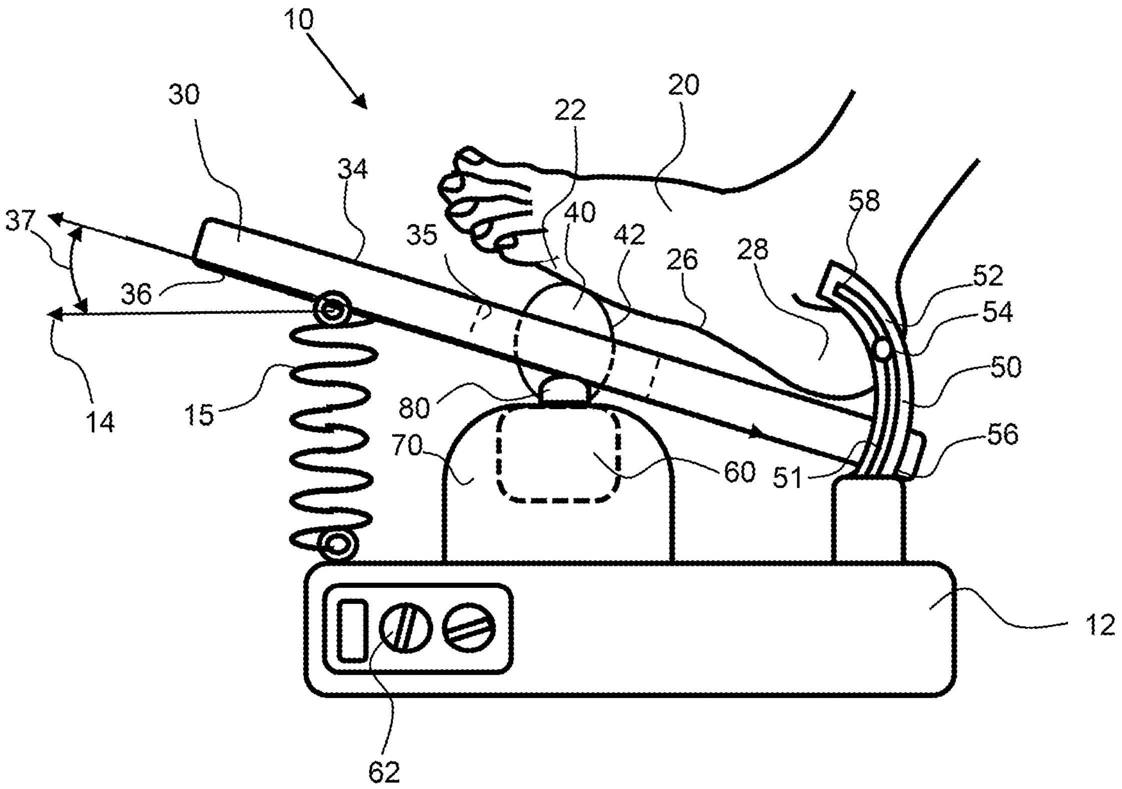
FIG. 3 shows a side view of the exemplary therapeutic massage device shown in FIG. 1 with the platform now pivoted upward to apply pressure on the ball of the foot and with the pressure head exchanged to a pressure head having a smaller size.
Figure 4:
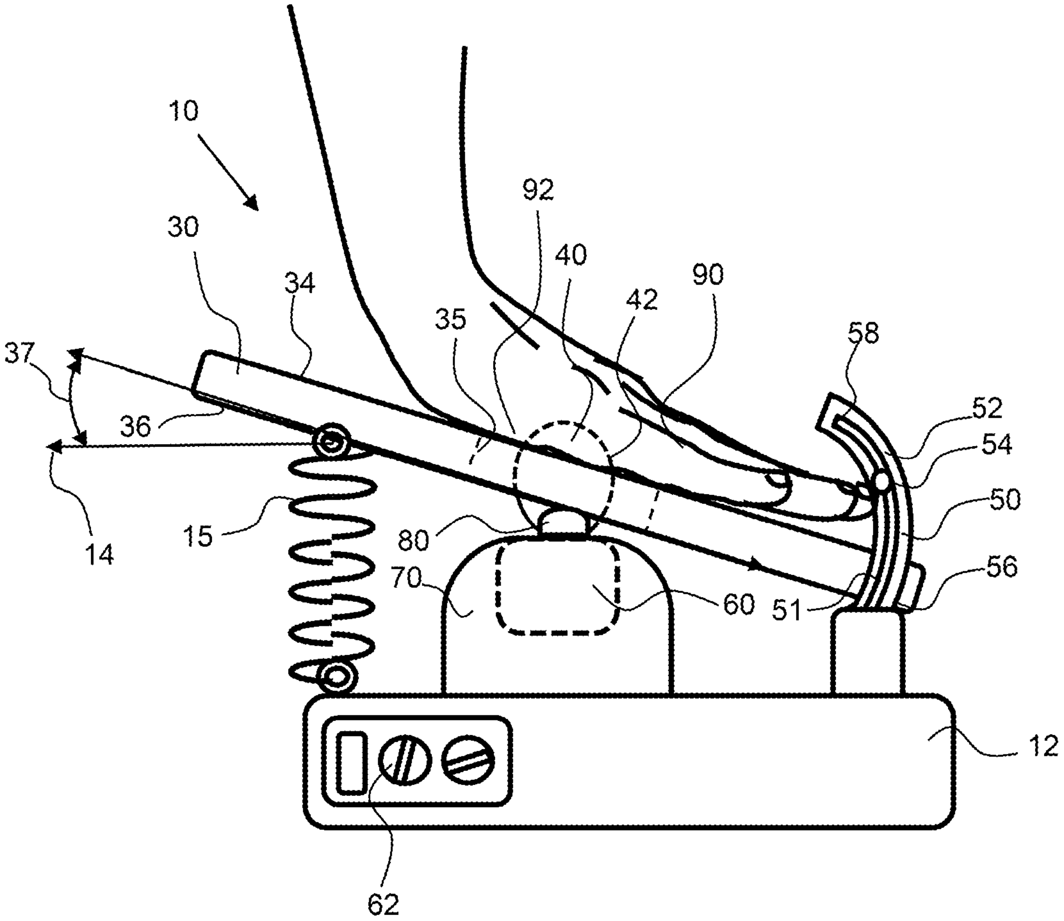
FIG. 4 shows a side view of the exemplary therapeutic massage device shown in FIG. 1 with the platform now pivoted upward to apply pressure on the palm of a hand and with the pressure head exchanged to a pressure head having a smaller size.

As shown in FIGS. 3 and 4, the platform is angled upward a pivot angle 37. In FIG. 3, a foot 20 is being pressed down on the platform with the ball 22 of the foot being configured over the curved surface portion 42 of the pressure head 40. Also shown in FIG. 3, the pressure head 40 is exchanged from the pressure head shown in FIGS. 1 and 2, for a smaller sized pressure head. As described herein the pressure heads may be exchanged to provide effective therapy for various portions of a person's foot. The curved surface portion 42 of the pressure head 40 shown in FIG. 3 has a smaller radius of curvature than the radius of curvature of the curved surface portions of the pressure heads shown in FIGS. 1 and 2.

As shown in FIG. 4, a hand 90 is being pressed down on the platform with the palm 92 of the hand being configured over the curved surface portion 42 of the pressure head 40.

Figure 5:
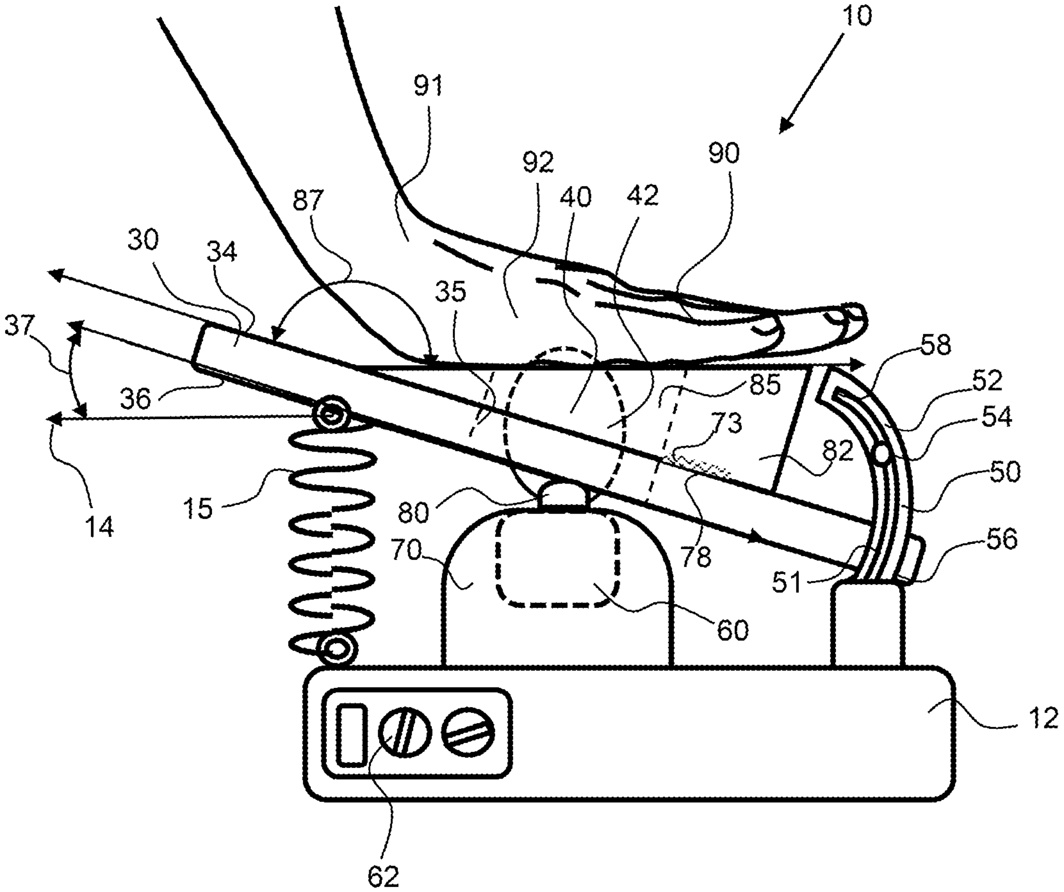
FIG. 5 shows a side view of the exemplary therapeutic massage device shown in FIG. 4 with a wedge detachably attached to the platform to create an interface angle between the wedge and the platform to increase flexure about the wrist joint from the flexure shown in FIG. 4.

As shown in FIG. 5, a wedge 82 is configured over the platform 30 to produce an interface angle 87 and between the platform and the wedge to increase flexure of the wrist. The wedge also produces a desired amount of exposure of the pressure head for a desired treatment. Without the wedge, the pressure head would extend a much greater height above the therapy side 34 of the platform. The hand 90 can be pressed against the wedge with a high degree of flexure about the joint 91, the wrist, to activate muscles, cartilage, tendons and/or nerves for treatment. The wedge has a wedge aperture 85 to enable the pressure head to extend up through the wedge an extend from the wedge surface. The wedge could be flipped upside down and configured over the pressure head to change the flexure angle of an appendage configured thereon. The wedge may have hook-and-loop fastener 73 material to detachably attach to hook-and-loop fastener 78 on the therapy side 34 of the platform. The therapy side of the platform may have hook-and-loop fastener for this purpose.

Figure 6:
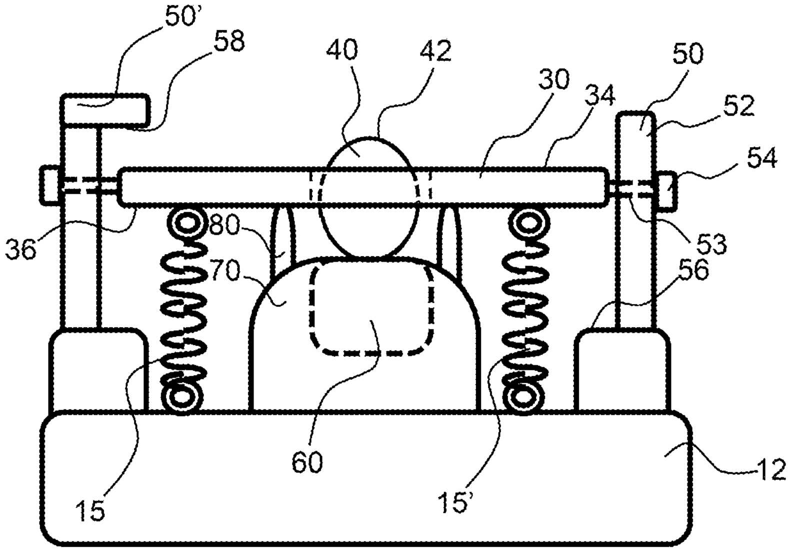
FIG. 6 shows an end view of an exemplary therapeutic massage device having angle lock assemblies on either side to enable a pivot angle of the platform to be fixed for effective therapy.

The exemplary massage device 10 has a springs 15, or pair of springs 15, 15' that extend between the base and the platform to provide some resistance to the pivoting of the platform, as shown in FIG. 6. The spring force may stabilize the platform and prevent rapid changes in pivot angle. Also, additional force may be required to overcome the spring force and this may aid in effective therapy.

An angle lock assembly 50 may be used to fix the platform 30 in a fixed position, from horizontal to a desired pivot angle. The angle lock assembly may have an angle lock rail 52 and an angle lock 54 that can secure the platform with respect to the angle lock rail. The angle lock assembly may have a lower angle stop 56, which may be the end of an angle slot 51, or an interference object, as shown in FIG. 4. Likewise, the angle lock assembly may have an upper angle stop 58, which again may be an end of the angle slot or an interference object or extension from the rail that the platform hits when pivoting to prevent further pivoting. It may be desired to lock the platform in a fixed position even when configured at the upper or lower angle stops to ensure the platform does not abruptly pivot during use. A person may be pressing down on the platform and this may cause the platform to pivot if the person's weight or pressure is shifted.

A vibration device 60 is coupled with the pressure head 40 to produce vibration of the pressure head. A vibration control 62 allows a user to control the vibration, such as the amplitude and/or frequency of vibration for effective therapy. As shown, the vibration control has two separate dials but it may have a single dial to control the magnitude of vibration, or amplitude.

As shown in FIG. 6, the exemplary therapeutic massage device 10 has an angle lock assemblies 50, 50' on either side of the pressure head and the platform 30 to enable a pivot angle of the platform to be fixed for effective therapy. A lock coupler may extend from the platform 40 and engage with the angle lock rail 52. The lock coupler may extend through the angle slot and couple with the angle lock 54, such as a knob that can be used to tighten against the angle lock rail. The lock coupler may also be configured to interface with stops along the angle lock rail, to secure the platform in a fixed pivot angle. An upper angle stop 58 is an extension from the angle lock rail 52, but may be an end of an angle lock slot (not shown). The lower angle stop 56 may be an interference extension from the angle lock rail as well. The angle lock 54 may be tightened to secure the platform in position or it may rest against a stop along the angle lock slot or rail.

Figure 7:
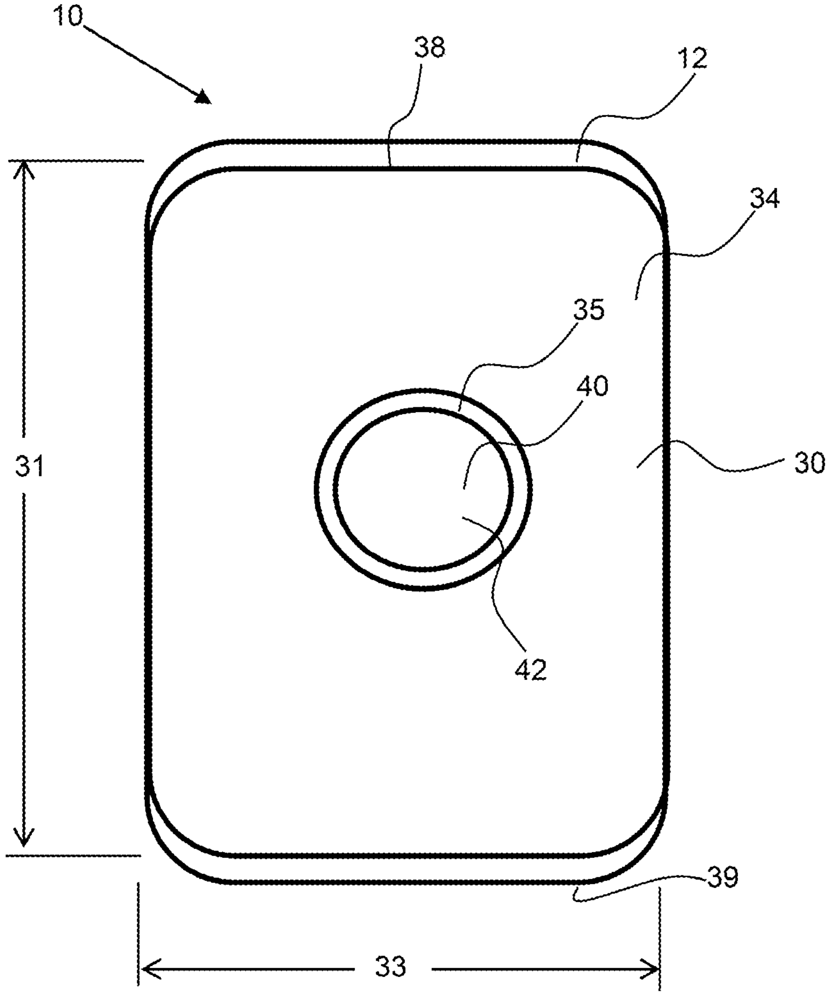
FIG. 7 shows a top view of an exemplary therapeutic massage device having a platform with a pressure head coupled with the base and extending through a head aperture in the platform.

As shown in FIG. 7, an exemplary therapeutic massage device 10 has a head aperture 35 to enable the platform 30 to pivot about the pressure head 40. There may be some clearance or gap distance between the pressure head and the platform to allow pressure heads of various sizes to be interchanged for effective therapy. The platform 30 has a length 31 from the front 38 to the back 39 and a width 33 from a left side to a right side.

Figure 8:
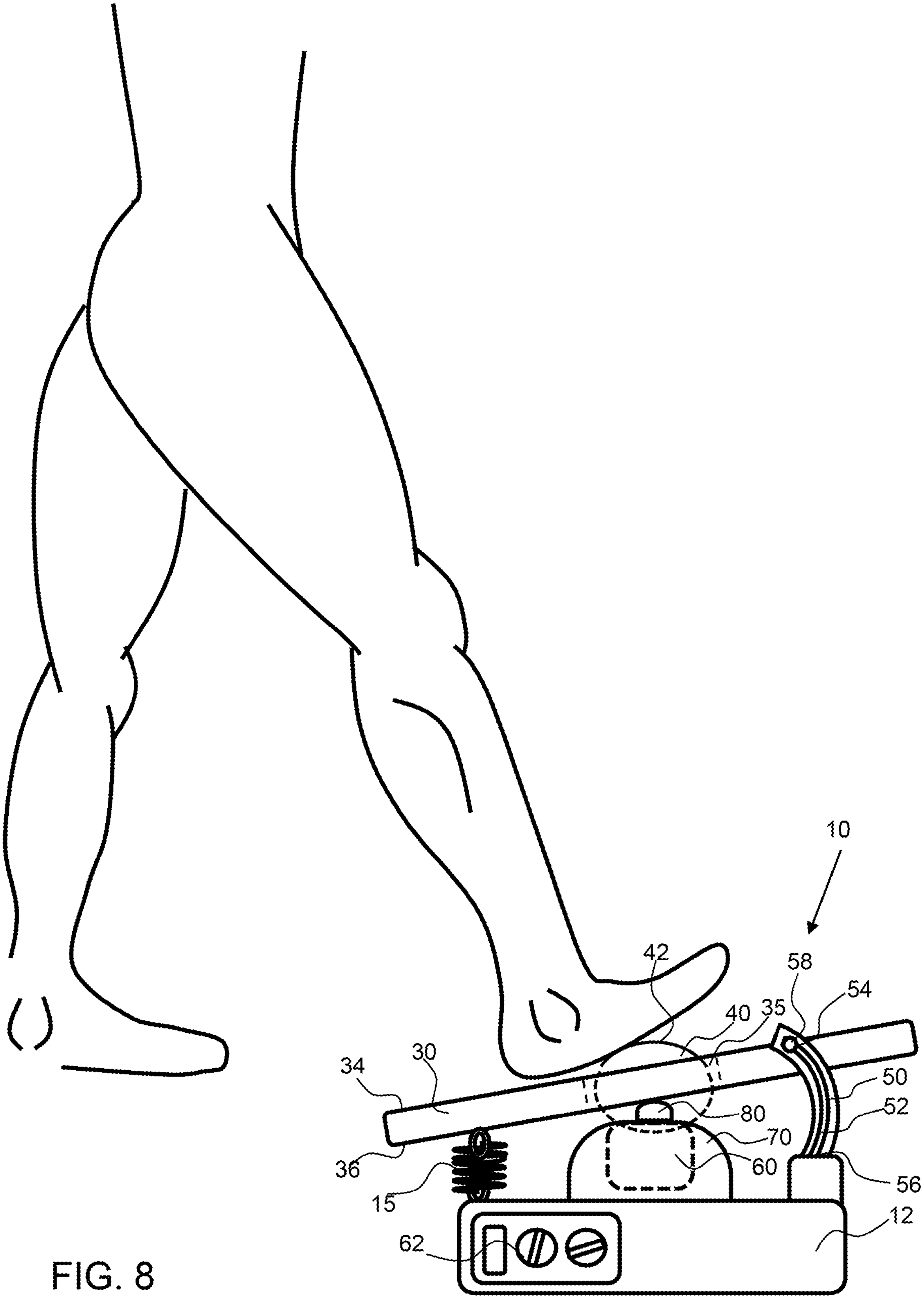
FIG. 8 shows a side view of an exemplary therapeutic massage device and a person applying pressure therapy to the arch of their foot with the platform at an incline angle.

As shown in FIG. 8, a person is extending their leg and applying pressure to the pressure head 40 of the therapeutic massage device 10. The platform is angled up and the angle lock 54 secures the platform in position. Not that the lock coupler may be hitting the end of the angle slot 51 as well. The vibration control 62 is configured such that the vibration device 62 is vibrating the pressure head. The spring is compressed in the embodiment. Note that springs may be configured on either end of the platform and/or on either side of the platform, on opposing sides of the pressure head.

Figure 9:
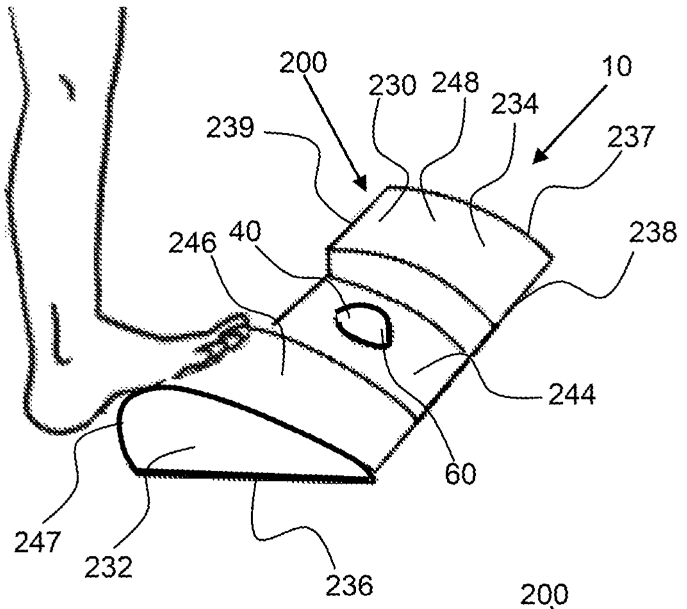
FIG. 9 shows a perspective view of an exemplary therapeutic massage device having a split teardrop shaped cross-section along the width axis of the left and right therapy portions and a vibration device in a recessed therapy area with a person stretching their calf and foot muscles on the front rounded surface of the therapeutic massage device.
Figure 10:
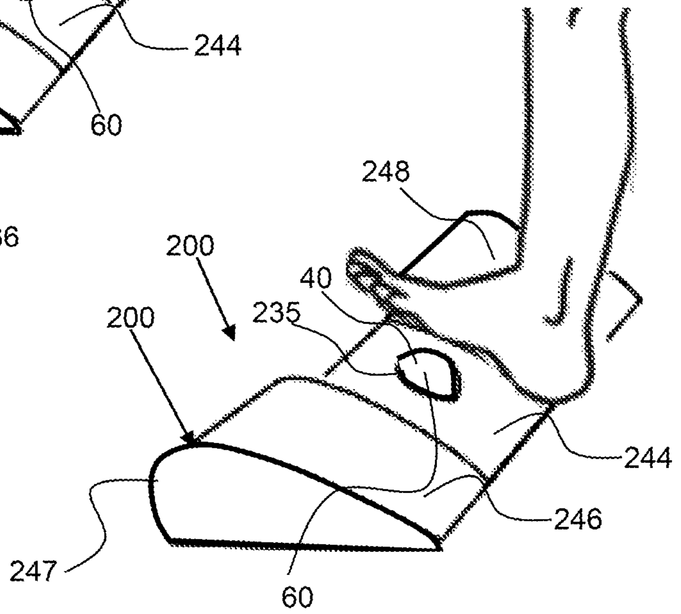
FIG. 10 shows a perspective view of the exemplary therapeutic massage device shown in FIG. 9, with a person placing the arch of their foot over the vibration device of the therapeutic massage device.
Figure 11:
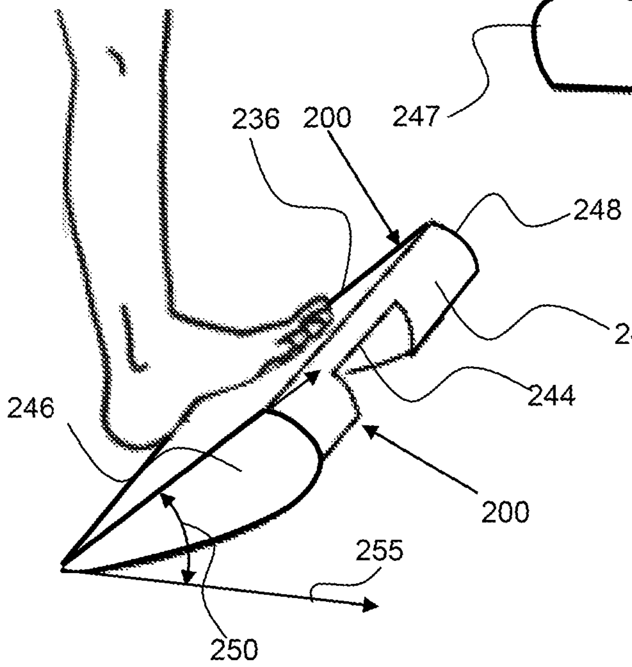
FIG. 11 shows a perspective view of the exemplary therapeutic massage device shown in FIG. 9, turned upside down with the person's foot flexing as the exemplary therapeutic device rocks or rotates on the rounded tear-drop shaped portion.
Figure 12:
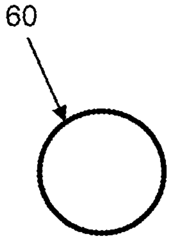
FIG. 12 shows an exemplary vibration device, a massage ball.
Figure 15:
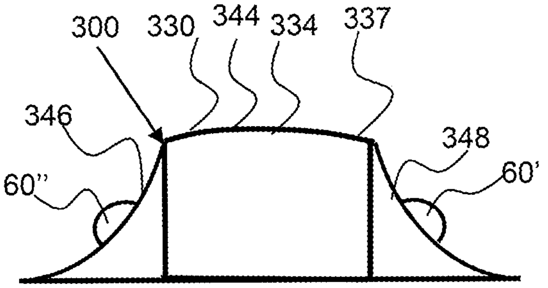
FIG. 15 shows a back view of the exemplary therapeutic massage shown in FIG. 13.
Figure 14:
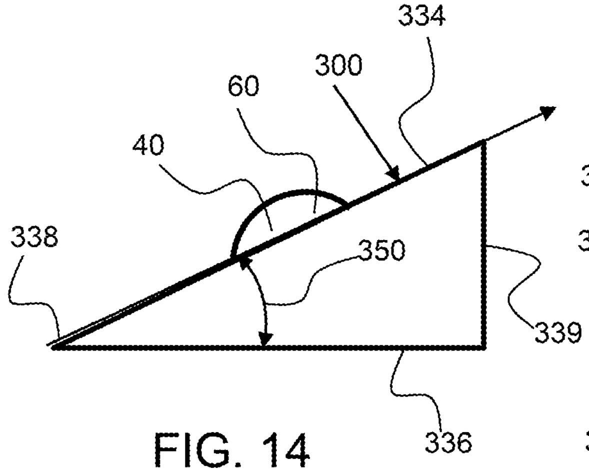
FIG. 14 shows a side cross-sectional view of the exemplary therapeutic massage device shown in FIG. 13, having a wedge-shaped cross-section across the width.
Figure 13:
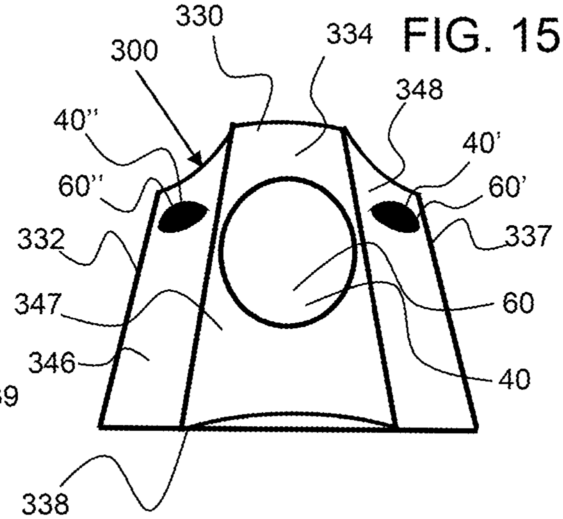
FIG. 13 shows an exemplary therapeutic massage device having a generally wedge shape from front to back and curved side portions extending down from a convex central portion having a vibration device therein.
Figure 16:
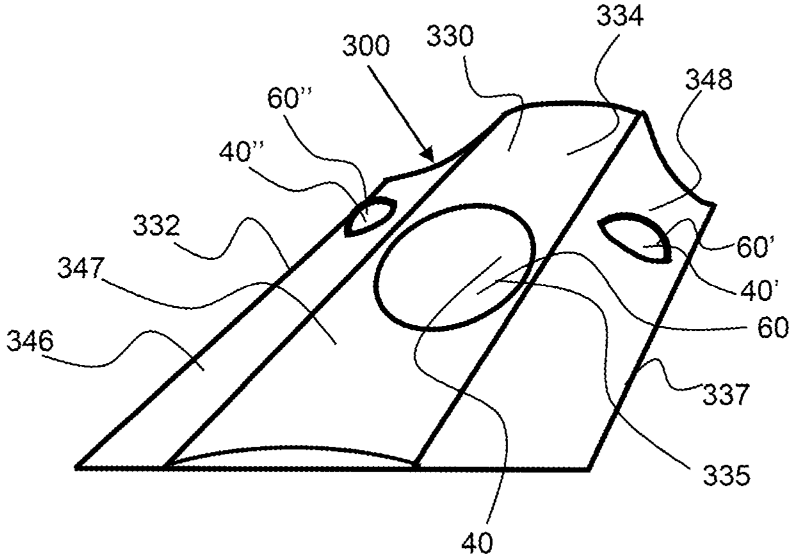
FIG. 16 shows a perspective view of the exemplary therapeutic massage shown in FIG. 13.

Referring now to FIGS. 9 to 11, an exemplary therapeutic massage device 200 has a split teardrop shaped cross-section along the width axis in the left therapy portion 246 and right therapy portion 248. A recessed therapy portion 244 is configured between the left therapy portion and right therapy portion and is recessed along the therapy side 234 of the platform 230. The recessed therapy portion has a pressure head 40, which may include a vibration device 60. The pressure head may be a vibrating ball that fits within a head aperture 235 in the platform and may be interchangeable with pressure heads and/or vibration devices of different sizes or diameters. As shown in FIG. 9, a person is stretching their calf and foot muscles by placing the ball of their foot on the curved portion 247 of the left therapy portion 246. As shown in FIG. 10, a person is placing the arch of their foot over the vibration device 60 of the therapeutic massage device 200. As shown in FIG. 11, the exemplary therapeutic massage device is turned upside down wherein the person's foot can flex and pivot as the exemplary therapeutic device rotates on the curved portion 247 of the tear-drop shaped portion side therapy portions. A stretch angle 250 is formed by the base side 236 and a ground surface 255. This stretch angle is adjustable. This therapy configuration enables stretching of the foot, and leg muscles and hits focal points to trigger inner muscle activation. The exemplary therapeutic massage device has a depth from the front 238 to the back 239 and a width from a left side 232 to a right side 237. As shown in FIG. 11, the stretch as well as hitting the focal point to trigger inner muscle activation Referring now to FIGS. 12 to 16, an exemplary multi-side therapeutic massage device 300 has pressure heads 40-40", that may include a vibration device 60-60", respectively, such as a vibration ball as shown in FIG. 12. As shown in FIGS. 13 to 16, an exemplary therapeutic massage device has a generally wedge shape platform extending from a front side 338 to a back side 339 that extends a wedge angle 350 from a ground surface, or base side 336. The platform has concave curved side portions extending down from a convex therapy side 334 having a vibration device 60 therein. Each of the left therapy portion 346 and right therapy portions 348 have a concave curve surface from the convex curved therapy portion to the base side 336. The centrally located curved therapy portion 344 has a convex curved therapy surface 347 that is inclined from the front 338 side to the back side 339 and is convex in shape or dome shaped. The foot platform 330 has a wedge-shaped cross-section across the width, as best shown in FIG. 14. This wedge shape enables flexure of a joint when extending from the front base end up along the therapy side 334 and over the pressure head 40 and/or vibration device 60 to activate muscles. A body part may also be positioned from either side and up over the concave side surfaces of the left or right therapy portions. A pressure head, with or without the vibration device, is configured on the convex curved therapy surface 347, left therapy portion 346 and right therapy portions 348 and may be used to provide pressure and vibration therapy while a body part is flexed or stretched into the concave surface or area, such as the bottom of a foot. The exemplary therapeutic massage device has a depth from the front side 338 to the back side 339 and a width from a left side 332 to a right side 337. The pressure head 40, may include a vibration device 60. The pressure head may be a vibrating ball that fits within a head aperture 335 in the platform and may be interchangeable with pressure heads and/or vibration devices of different sizes or diameters.

Figure 17:
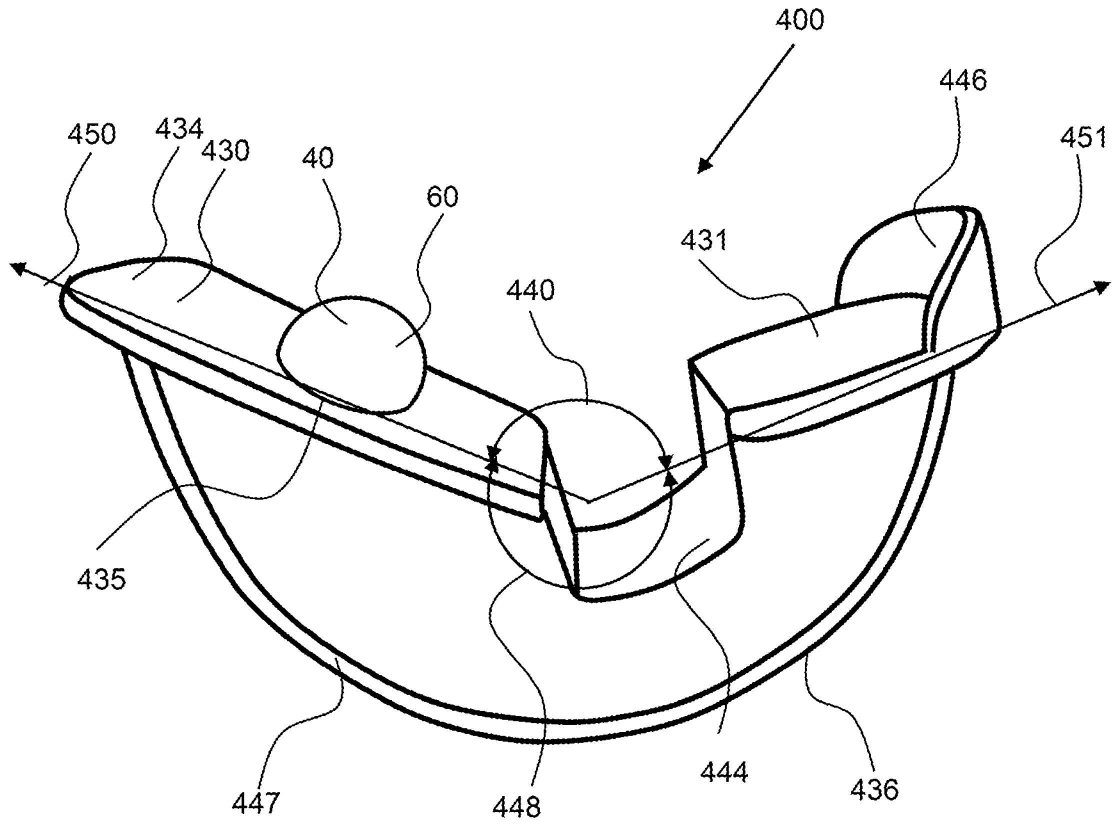
FIG. 17 shows an exemplary rocking or rotating therapeutic massage device having a rounded base side with two platforms having platform axis that intersect to form a complimentary platform angle configured for stretching a body part and in particular a foot and a vibration device configured in the front platform.
Figure 18:
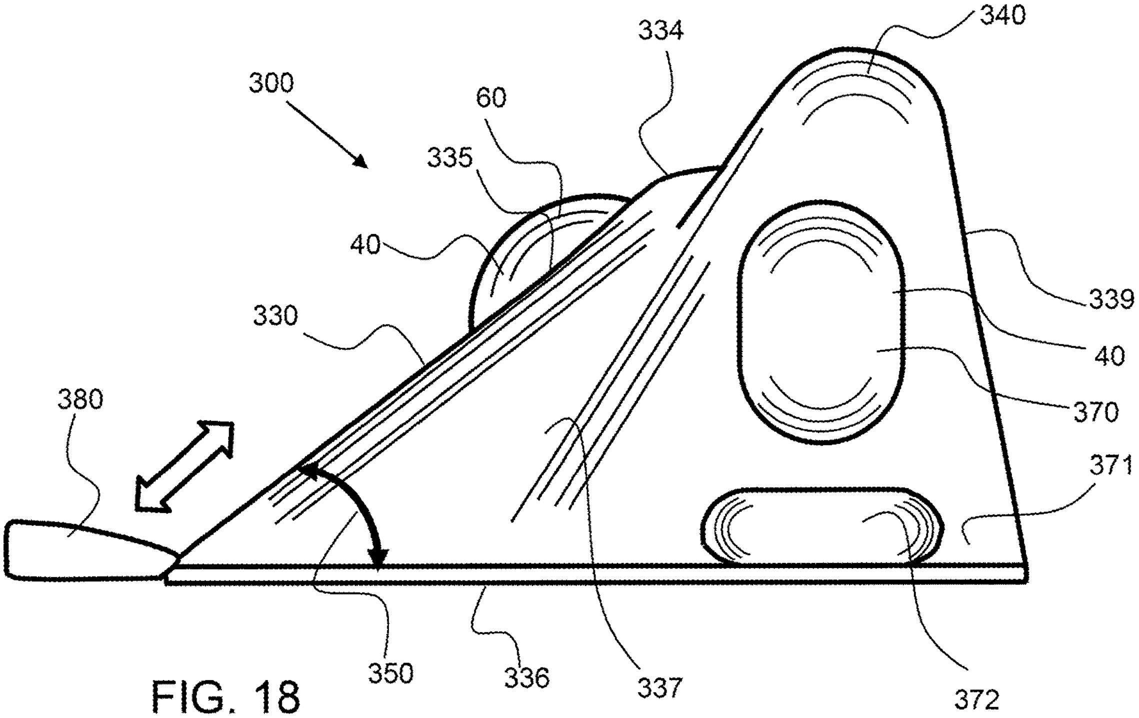
FIG. 18 shows a right side of an exemplary multi-side therapeutic massage device having a front foot platform with a vibration device and, on the right side, an upper pressure head and a flange with a flange pressure head.

As shown in FIG. 17, an exemplary rocking therapeutic massage device 400 has a rounded base side 436 with a curve portion extending a therapy angle 448 that is more than 180 degrees or a supplementary angle. The device has two platforms 430, 431 each having a platform axis 450, 451, respectively, that intersect to form a platform angle 440, that is an obtuse angle, configured for stretching a body part and in particular a foot and a vibration device configured in the front platform. The two foot platforms are separated by a recessed therapy area 444. The first platform 430 has a pressure head 40, which may include a vibration device 60 extending up from the therapy side 434 of the device. The pressure head may be a vibrating ball that fits within a head aperture 435 in the platform and may be interchangeable with pressure heads and/or vibration devices of different sizes or diameters. A heel cup 446 is configured on the end of the second platform 431 to retain a body part, such as a heel on the platforms. The heel cup may be slidably engaged with the front side or foot platform to allow adjustment for different sized feet.

Referring now to FIGS. 18-23, an exemplary multi-side therapeutic massage device 300, which is generally a wedge shaped therapeutic massage device having a foot platform 330 that extends from the base side 336 toward the back side 339 at a wedge angle 350. The foot platform has a pressure head 40, which may be a vibration device 60, that may be detachably attached into a head aperture 335. The front therapy side 334 may be used for therapy of the foot or hand, for example. Also, the multi-side exemplary therapeutic massage device 300 has a left side 332 and right side 337, each having therapy components. The right side 337 has a right flange 371 that extends out from the base 336 and has a flange pressure head 372. A right-side upper pressure head 370 is configured above the right flange and is a protrusion from the right side. A right therapy concave surface 374 is configured between the upper pressure head 370 and the right flange pressure head 372, which is a curved surface that is concave in shape. The left side 332 has a left flange 321 that extends out from the base 336 and has a flange pressure head 322. A right-side upper pressure head 320 is configured above the right flange and is a protrusion from the right side. A right therapy concave surface 374 is configured between the upper pressure head 320 and the right flange pressure head 322, which is a curved surface that is concave in shape. The heel of the foot may be placed on the flange pressure head and the ball of the foot may be place on the upper pressure head to stretch the arch of the foot and/or massage the heel of the foot or the ball of the foot, on either the left or right side.

The right upper pressure head 370 may have a substantially different shape, such as protruding at least 20% more or less than the left upper pressure head, or have a radius of curvature that is at least 20% different than the radius of curvature of the left upper pressure head. Likewise, the right flange pressure head 372 may have a substantially different shape, such as protruding at least 20% more or less than the left upper pressure head, or have a radius of curvature that is at least 20% different than the radius of curvature of the left upper pressure head.

The multi-side therapeutic massage device 300 may also have a top therapy portion 340 that includes a curved surface from the top to at least one of the front, left and/or right sides. This curved surface may have a radius of curvature of about 30 mm or more, about 50 mm or more or about 70 mm or more and may extend from the top to the front, left and right side of the multi-side therapeutic massage device 300.

Figure 19:
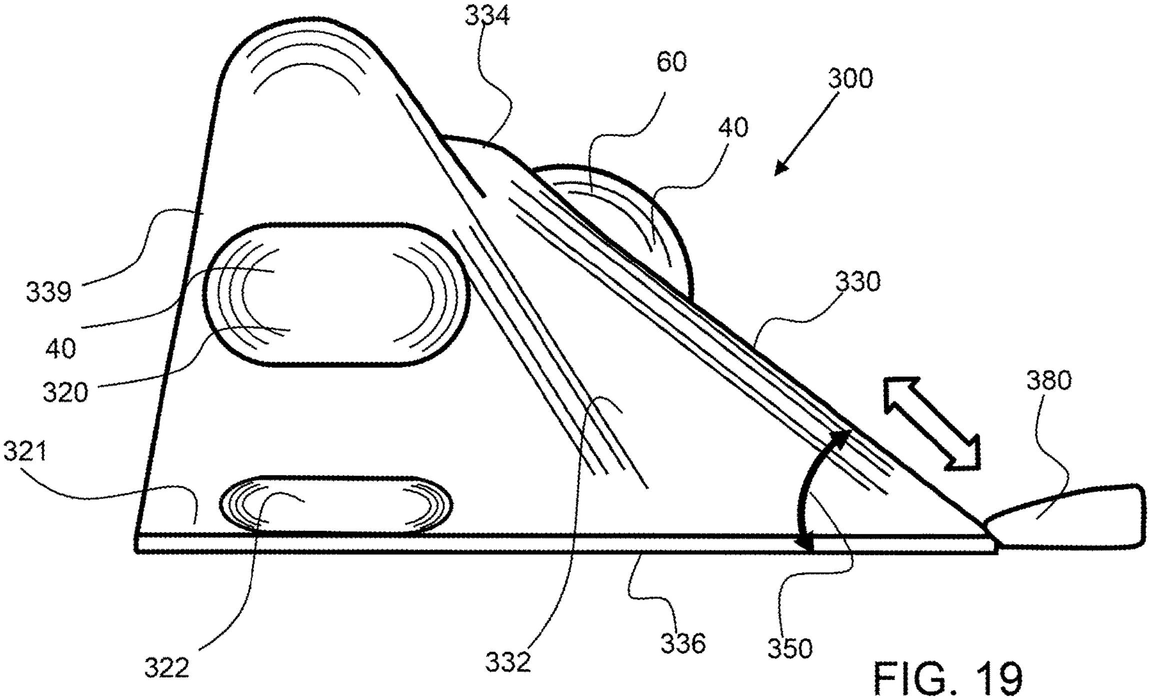
FIG. 19 shows a left side of an exemplary multi-side therapeutic massage device, shown in FIG. 18, having a front foot platform with a vibration device and, on the left side, an upper pressure head and a flange with a flange pressure head.
Figure 22:
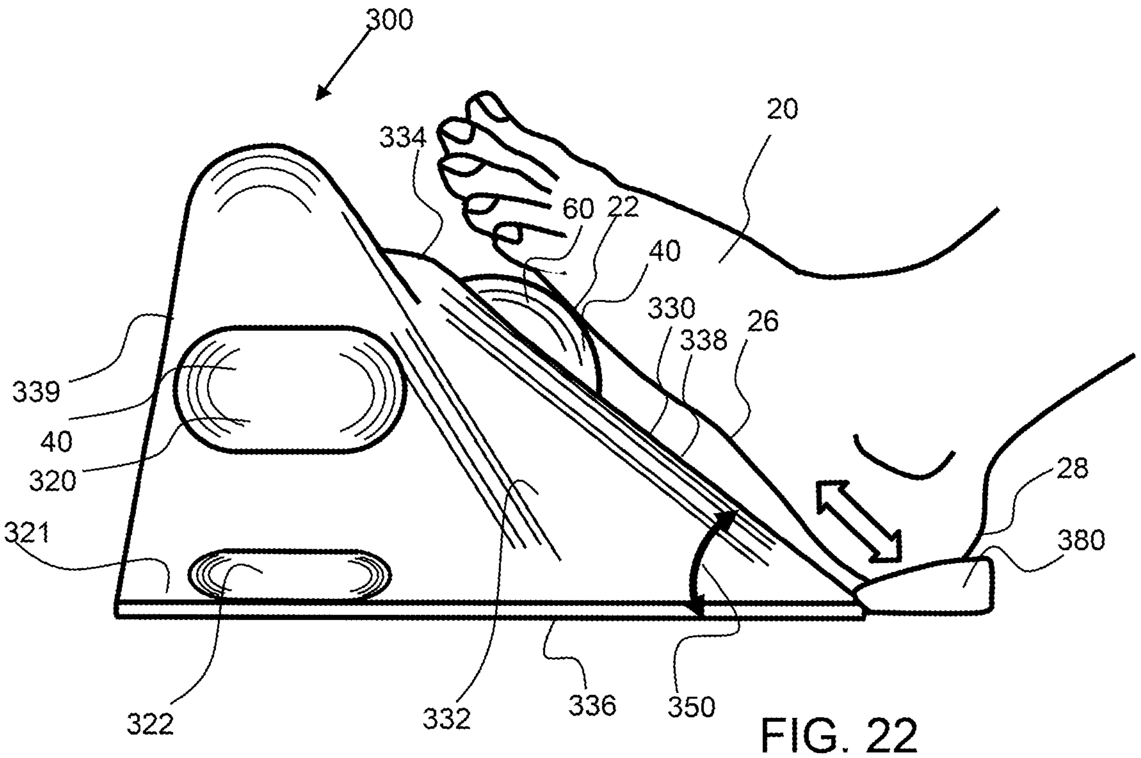
FIG. 22 shows a left side of an exemplary multi-side therapeutic massage device as shown in FIG. 19, with a foot configured on front of the therapeutic massage device and on the foot platform with the ball of the foot on the pressure head and the heel of the foot configured in the heel cup.

As shown in FIG. 22, an exemplary multi-side therapeutic massage device 300 as shown in FIG. 19, has a foot 20 configured on front side 338 of the therapeutic massage device and on the foot platform 330 with the ball 22 of the foot on the pressure head 40 and the heel 28 of the foot configured in the heel cup 380. Note that the arch 26 of the foot 20 is configured between the pressure head and the heel cup and may be stretched during therapy. The pressure head is a vibration device 60 and has a convex shape. The vibration device may be configured to roll within an aperture in the foot platform 330 during therapy. Also, the pressure head or vibration device may be spherical in shape and have a convex surface for contact with the foot.

Figure 20:
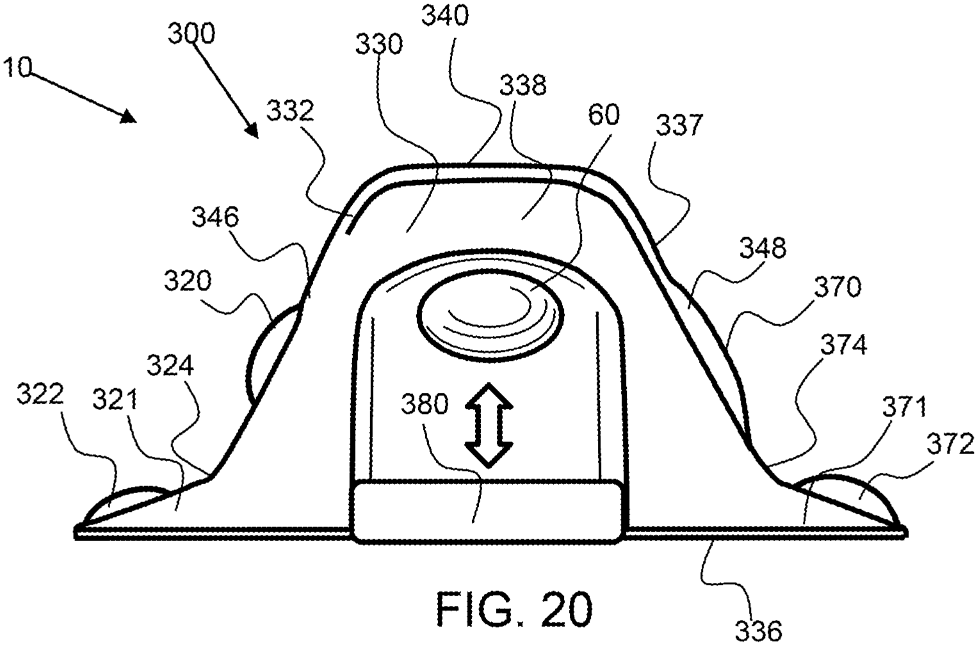
FIG. 20 shows a front side of an exemplary multi-side therapeutic massage device, shown in FIGS. 18 and 19, having a front foot platform with a vibration device and, a left and a right side, each with a flange and pressure head on both the flange and an upper pressure head.
Figure 21:
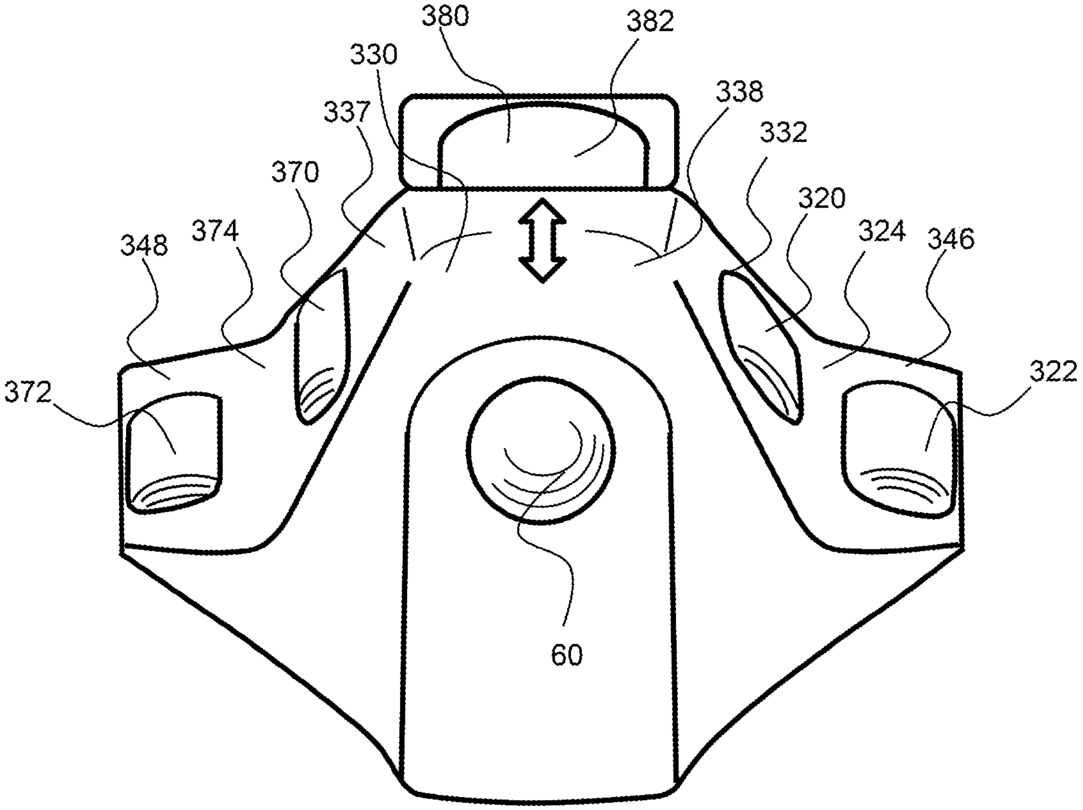
FIG. 21 shows a top side of an exemplary multi-side therapeutic massage device shown in FIGS. 18-20, having a front foot platform with a vibration device and, a left and a right side, each with a flange and pressure head on both the flange and an upper pressure head.
Figure 23:
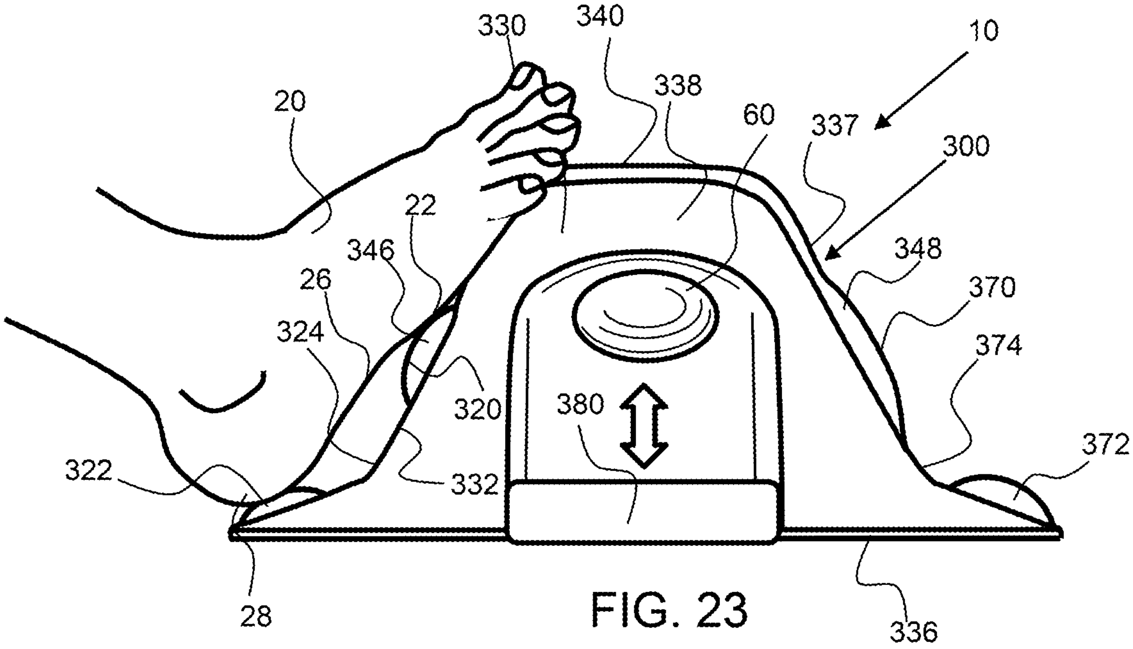
FIG. 23 shows a front side of an exemplary multi-side therapeutic massage device as shown in FIG. 20, with a foot configured on the left side with the ball of the foot on the left therapy portion and proximal the left upper pressure head and the heel of the foot configured on left side flange pressure head.

As shown in FIG. 23, an exemplary multi-side therapeutic massage device 300 as shown in FIG. 20, has a foot 20 configured on the left side 332 with the ball 22 of the foot on the left therapy portion 346 and proximal the left pressure head 320 and the heel 28 of the foot configured on left side flange pressure head 322. The arch 26 of the foot is configured over the left therapy concave surface 324 to allow the arch to stretch during therapy. The left upper pressure head 320 and/or the left side flange pressure head 322 may be a vibration device or comprise a vibration device for providing additional therapy.

Figure 24:
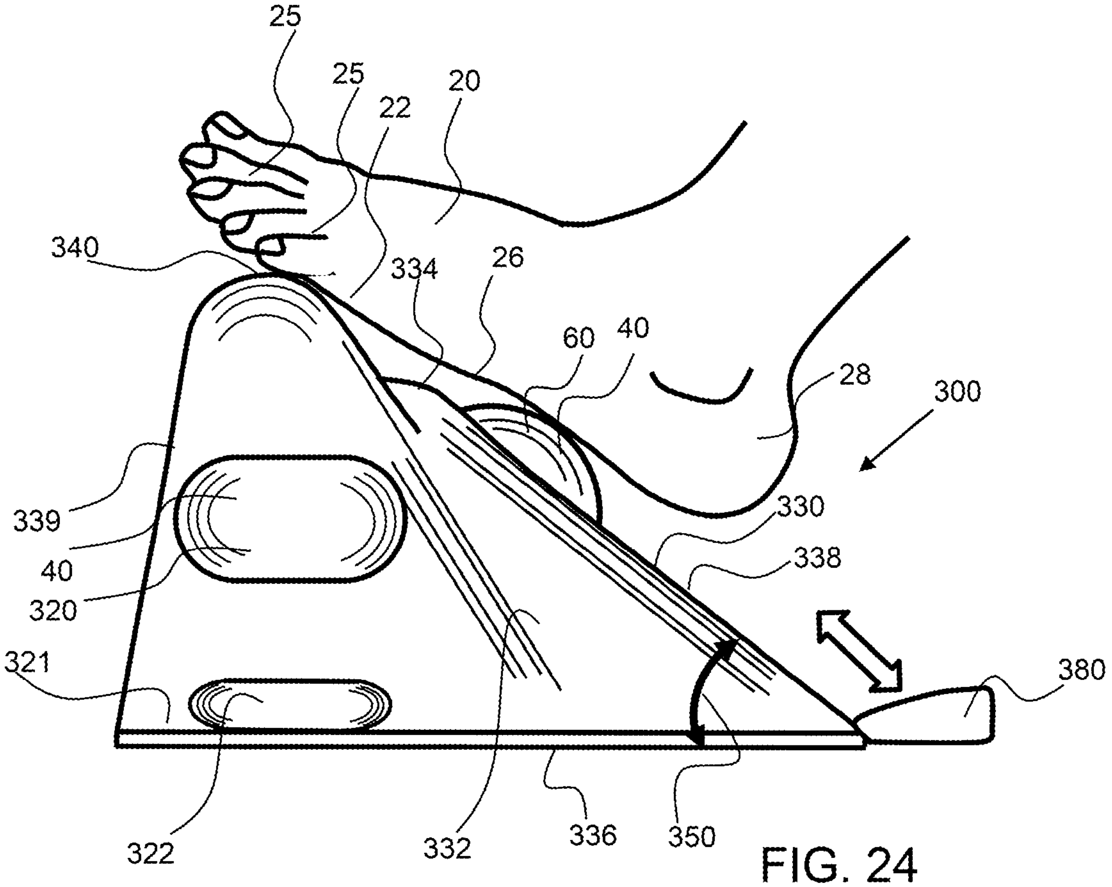
FIG. 24 shows a left side of an exemplary multi-side therapeutic massage device as shown in FIG. 19, with a foot configured on front of the therapeutic massage device with the toes and/or forefoot configured on the top therapy portion 340 and the back part of the arch 26 of the foot configured on the pressure head of the foot platform.

As shown in FIG. 24, and exemplary multi-side therapeutic massage device 300 as shown in FIG. 19, has a foot 20 configured on front side 338 of the therapeutic massage device with the toes 25 and/or forefoot 21 configured on the top therapy portion 340 and the back part of the arch 26 of the foot configured on the pressure head 40 of the foot platform, which includes a vibration device 60.

Referring now to FIGS. 25 to 29, a convertible therapeutic massage device 600 that comprise a first portion 603 and second portion 605, that are each a wedged shape therapeutic massage device having a foot platform in a recessed area that extends at a wedge angle from the base side to the back side and a pressure head within the recessed therapeutic area.

Figure 25:
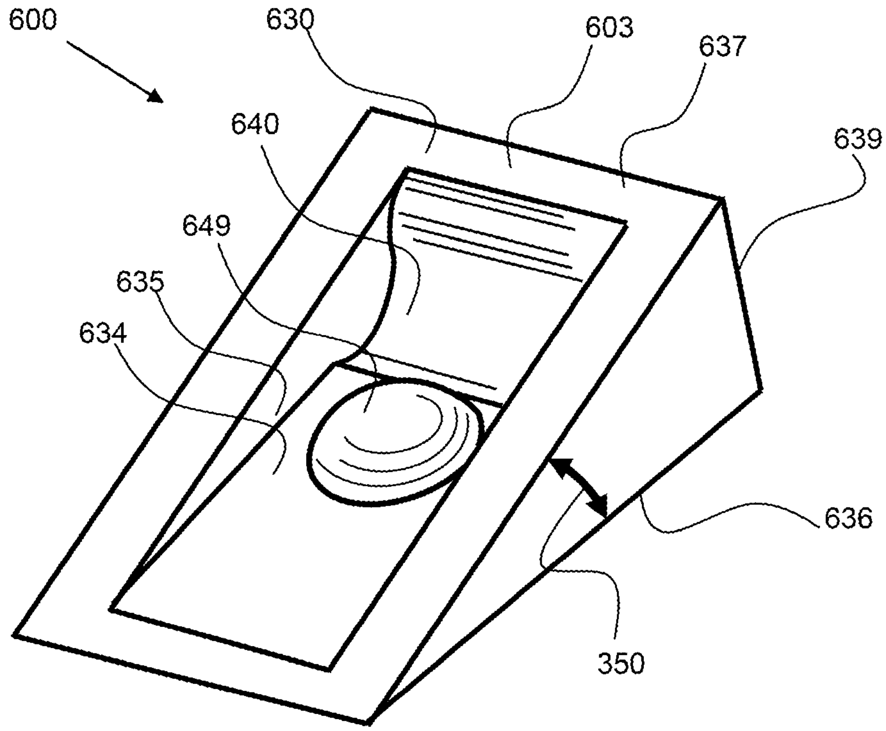
FIG. 25 shows a first portion of a convertible therapeutic massage device that is a wedged shape therapeutic massage device having a foot platform in a recessed area that extends at a wedge angle from the base side to the back side and a pressure head within the recessed therapeutic area.

As shown in FIG. 25, a first portion 603 of a convertible therapeutic massage device 600 is a wedged shape therapeutic massage device having a foot platform 634 in a recessed therapeutic area 635 that extends at a wedge angle 350 from the base side 636 to the back side 639 and a pressure head 649 within the recessed therapeutic area. The pressure head 649 may be a vibration device 60. Also, the first portion 603 has a receiver area 640 for receiving the pressure head 649' of the second portion, as shown in FIG. 25 and FIG. 26, or for receiving a body part for therapy such as the heel of a foot or palm of the hand.

Figure 26:
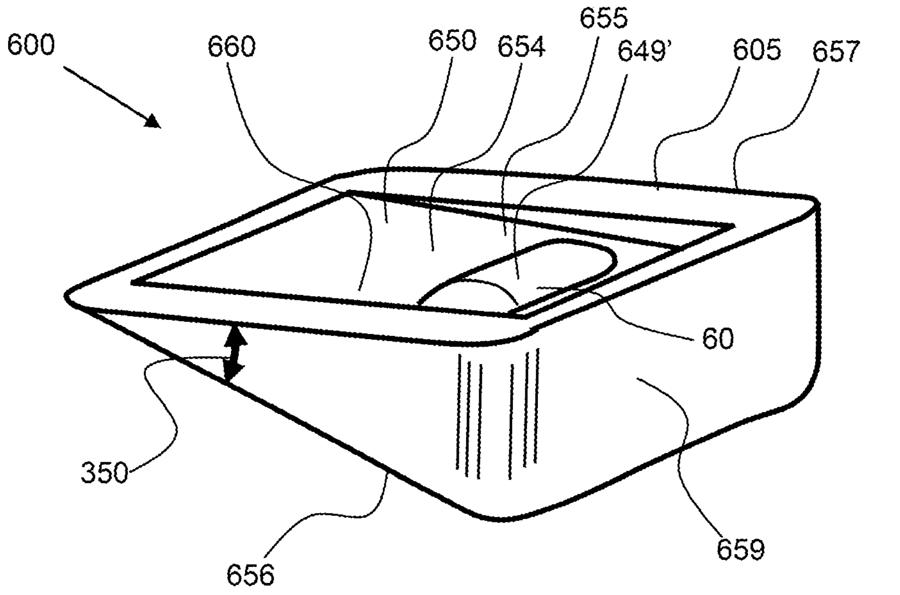
FIG. 26 shows a second portion of a convertible therapeutic massage device that is a wedged shape therapeutic massage device having a foot platform in a recessed area that extends at a wedge angle from the base side to the back side and a pressure head within the recessed therapeutic area.

As shown in FIG. 26, a second portion 605 of a convertible therapeutic massage device 600 is a wedged shape therapeutic massage device having a foot platform 654 in a recessed therapeutic area 655 that extends at a wedge angle 350 from the base side 656 to the foot platform 654 and a pressure head 649' within the recessed therapeutic area. The pressure head 649' may be a vibration device 60. Also, the first portion has a receiver area 640 for receiving the pressure head 649' of the second portion, as shown in FIG. 26. Note that the pressure heads may be recessed below the interface flange 637 of the first portion 603 and interface flange 657 of the second portion 605 and thereby not require a receiver area.

Figure 27:
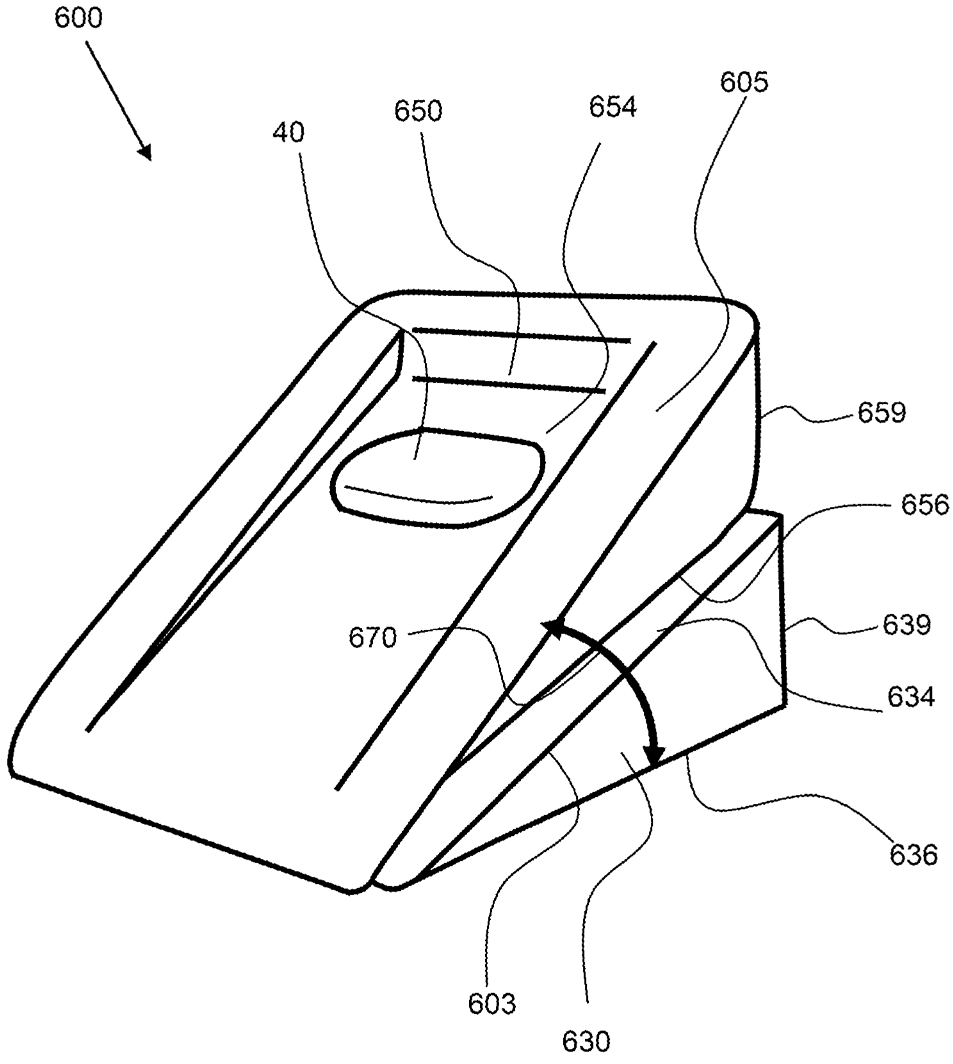
FIG. 27 shows the convertible therapeutic massage device shown in FIGS. 25 to 26 with the second portion stacked on the first portion to increase the therapy angle by stacking.

As shown in FIG. 27, the second wedge therapeutic massage device 650 is stacked on the first wedge therapeutic massage device 630 to increase the therapy angle 670. The back side 639 of first portion 603 and the back side 659 of the second portion 605 are aligned and on the same side of the stacked assembly.

Figure 28:
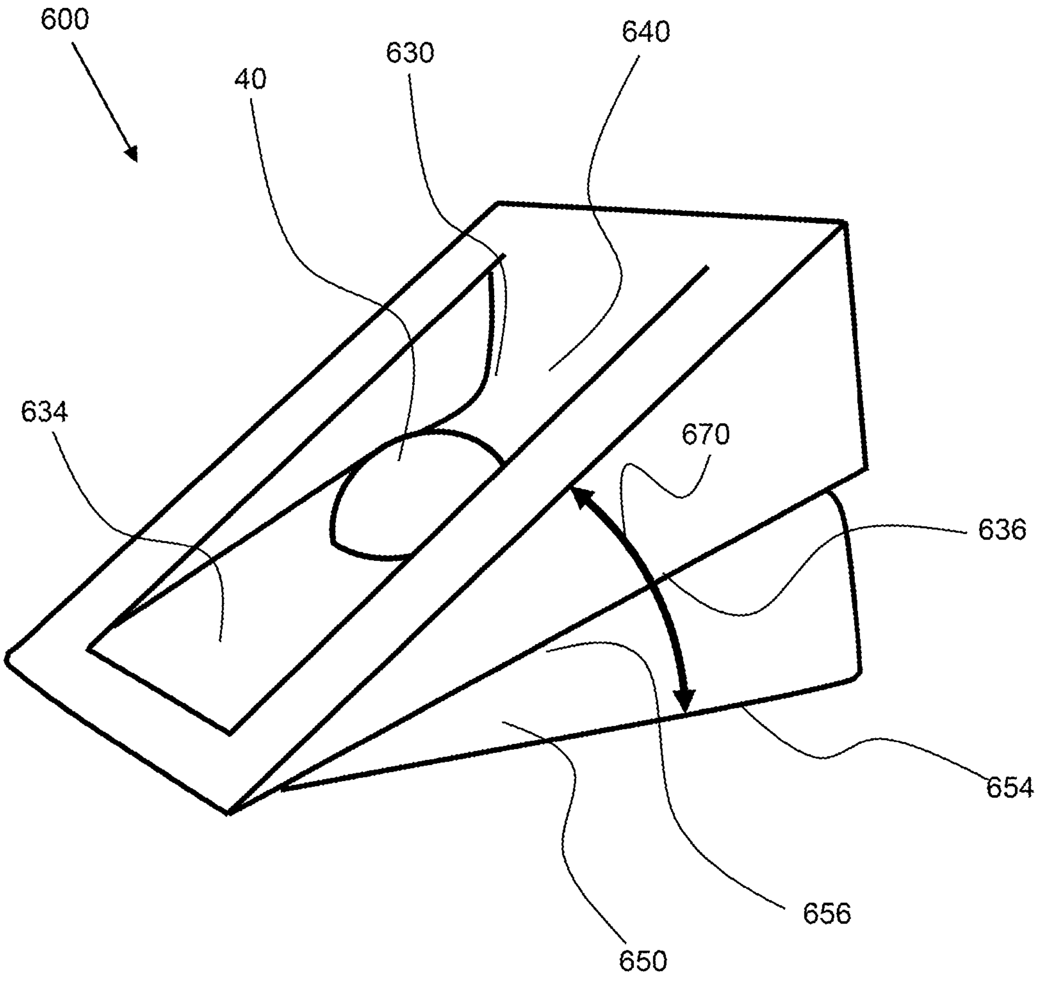
FIG. 28 shows the convertible therapeutic massage device shown in FIGS. 24 to 26 with the first portion stacked on the second portion to increase the therapy angle by stacking.

As shown in FIG. 28, the first wedge therapeutic massage device 630 is stacked on the second wedge therapeutic massage device 650 to increase the therapy angle 670. The two back sides of each of the first and second portions are on the same side as the stacked portions.

Figure 29:
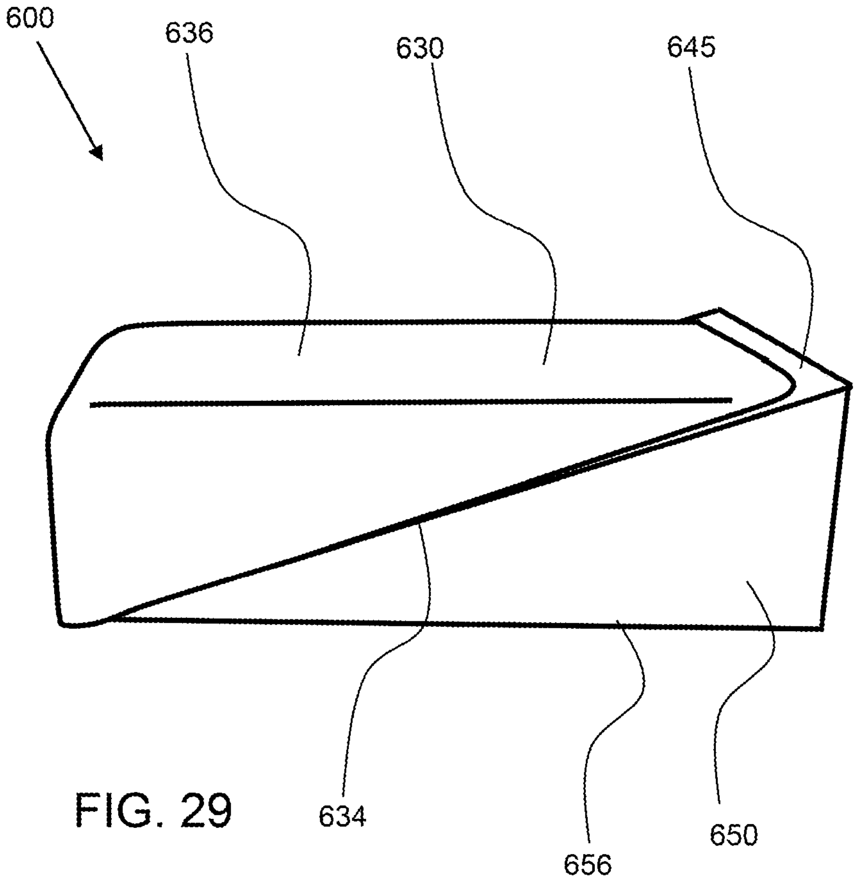
FIG. 29 shows the convertible therapeutic massage device shown in FIGS. 25 to 28 with the first portion stacked on the second to produce a block shape.

As shown in FIG. 29, the first wedge therapeutic massage device 630 is stacked on the second wedge therapeutic massage device 650 to produce a block shaped therapeutic device. The two back sides of each of the first and second portions are on opposing sides of the stacked assembly.

The first portion pressure head 649 may have a substantially different shape, such as protruding at least 20% more or 20% less than the second portion pressure head 649' or have a radius of curvature that is at least 20% different than the radius of curvature of the left upper pressure head.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A multi-side therapeutic massage device comprising:

a) a base side;

b) a back side;

c) a left side extending between the base side and the back side;

d) a right side extending between the base side and the back side;

e) a top therapy portion extending between a front side and the back side;

f) said front side comprising:

i) a foot platform that extends from the base side at a wedge angle of 30 degrees or more to the top therapy portion, whereby in use, the foot platform is configured to face a bottom surface of a foot of a user, with the bottom surface of the foot extending from a heel of the foot of the user to toes of the foot of the user; and ii) a head aperture in the foot platform, wherein the head aperture is the only head aperture in the foot platform;

iii) a single pressure head configured in said head aperture of the foot platform having a radius of curvature of 2.5 cm or more, wherein the single pressure head is the only pressure head that extends from the foot platform;

wherein the single pressure head extends partially into the foot platform through the head aperture and protrudes partially out from the foot platform;

wherein the pressure head is a vibrating ball configured to vibrate at an amplitude and frequency and wherein the pressure head is configured to rotate within the head aperture of the foot platform;

g) a heel cup coupled to and extending from the foot platform and configured to retain the heel of a foot therein; wherein the heel cup extends from said front side of the multi-side therapeutic massage device below the single pressure head; and whereby in use the multi-side therapeutic is configured to retain said heel of said foot in the heel cup with the bottom surface of the foot from the toes to said heel of said foot extending along the foot platform with the single pressure head contacting said bottom surface of the foot at a metatarsal arch of said foot.

2. The multi-side therapeutic massage device of claim 1, wherein the pressure head is detachably attached to the foot platform.

3. The multi-side therapeutic massage device of claim 1, wherein at least one of the right side or the left side further comprises an upper pressure head that is a protrusion from the respective left side or right side.

4. The multi-side therapeutic massage device of claim 3, wherein the right side comprises said upper pressure head.

5. The multi-side therapeutic massage device of claim 4, wherein the right side further comprises a right flange that extends out from the right side to the base and comprises a right flange pressure head, that is a convex protrusion from the right flange.

6. The multi-side therapeutic massage device of claim 5, wherein the right side further comprises a right therapy concave surface between the right flange pressure head and the right upper pressure head.

7. The multi-side therapeutic massage device of claim 3, wherein the left side comprises said upper pressure head and a left flange that extends out from the left side to the base and wherein the left flange comprises a left flange pressure head, that is a convex protrusion from the left flange.

8. The multi-side therapeutic massage device of claim 7, wherein the left side further comprises a left therapy concave surface between the left flange pressure head and the left upper pressure head.

9. The multi-side therapeutic massage device of claim 7, wherein the right side comprises an upper pressure head and a right flange that extends out from the right side to the base and wherein the right flange comprises a right flange pressure head, that is a protrusion from the right flange.

10. The multi-side therapeutic massage device of claim 9, wherein the right side further comprises a right therapy concave surface between the right flange pressure head and the right upper pressure head, and wherein the left side further comprises a left therapy concave surface between the left flange pressure head and the left upper pressure head.

11. The multi-side therapeutic massage device of claim 10, wherein the left flange pressure head has a radius of curvature that is at least 20% different from a radius of curvature of the right flange pressure head.

12. The multi-side therapeutic massage device of claim 1, wherein the left upper pressure head has a radius of curvature that is at least 20% different from a radius of curvature of the right upper pressure head.

13. The multi-side therapeutic massage device of claim 1, further comprising a top therapy surface that is a curved surface extending from the front side to the back side.

14. The multi-side therapeutic massage device of claim 1, wherein the top therapy surface has a curved surface with a radius of curvature of at least 30 mm.

15. The therapeutic massage device of claim 1, wherein the heel cup is slidably engaged with the foot platform.

* * * * *